United States Patent
Johnson et al.

(10) Patent No.: US 7,628,965 B2
(45) Date of Patent: Dec. 8, 2009

(54) ADVANCED CARBON DIOXIDE FUEL TANK INERTING SYSTEM WITH DESULFURIZATION

(75) Inventors: Russell Johnson, Elmhurst, IL (US); Stephen F. Yates, Arlington Heights, IL (US); Rehan Zaki, Naperville, IL (US)

(73) Assignee: Honeywell International Inc, Morristown, NJ (US)

( * ) Notice: Subject to any disclaimer, the term of this patent is extended or adjusted under 35 U.S.C. 154(b) by 477 days.

(21) Appl. No.: 11/556,410

(22) Filed: Nov. 3, 2006

(65) Prior Publication Data

US 2008/0107571 A1 May 8, 2008

(51) Int. Cl.
- *B01J 8/08* (2006.01)
- *B01J 8/02* (2006.01)
- *B01D 53/00* (2006.01)

(52) U.S. Cl. .................. 422/217; 422/211; 422/212; 422/222; 422/171; 422/172; 422/173; 422/144; 96/108; 96/130

(58) Field of Classification Search .................. 422/211, 422/212, 217, 222, 171, 172, 173, 144; 96/108, 96/130
See application file for complete search history.

(56) References Cited

U.S. PATENT DOCUMENTS

| | | | |
|---|---|---|---|
| 3,389,829 A | 6/1968 | Stanford | |
| 3,781,407 A | 12/1973 | Kamijo et al. | |
| 3,847,298 A | 11/1974 | Hamilton | |
| 3,899,099 A | 8/1975 | Oiestad | |
| 6,887,381 B2 | 5/2005 | Rohrbach et al. | |
| 2008/0187785 A1* | 8/2008 | Kwok | 429/12 |
| 2008/0199376 A1* | 8/2008 | Limaye et al. | 423/213.2 |

FOREIGN PATENT DOCUMENTS

| JP | 55-25659 A | 2/1980 |
|---|---|---|
| JP | 11-10578 A | 4/1999 |

OTHER PUBLICATIONS

Santosh Y. Limaya, Phyre Technologies,PowerPoint presentation found on the web at www.fire.tc.faa.gov/ppt/systems/20051102_FAA_OBIGGS_Presentation_condensed.ppt, dated Nov. 2, 2005.

* cited by examiner

*Primary Examiner*—Jennifer A Leung
*Assistant Examiner*—Lessanework Seifu
(74) *Attorney, Agent, or Firm*—Oral Caglar, Esq.

(57) ABSTRACT

A gas generating system comprises a catalytic reactor in fluid communication with a sulfur separator. The catalytic reactor oxidizes a fuel to provide a supply of carbon dioxide. The sulfur separator removes sulfur components from the stream before or after the fuel is oxidized. A portion of the hot exhaust gas from the catalytic reactor can be used to regenerate an adsorption bed of the sulfur separator.

19 Claims, 9 Drawing Sheets

ADVANCED CARBON DIOXIDE FUEL TANK INERTING SYSTEM WITH DESULFURIZATION

CROSS-REFERENCE TO RELATED APPLICATION

The present invention is related to U.S. patent application Ser. No. 11/560,290, which was filed on Nov. 15, 2006; and is incorporated herein by reference.

BACKGROUND OF THE INVENTION

The present invention generally relates to gas generating systems and, more particularly, to gas generating systems for inerting fuel tanks.

The combination of fuel vapor and air existing in the fuel tank ullage (empty space above the fuel) can represent a significant threat. For example, the loss of TWA Flight 800, with all passengers and crew several years ago, was caused by the ignition of the fuel vapor in the central fuel tank. The fuel vapor suddenly reacted with great violence with the oxygen present in the ullage. This led to an explosion and subsequent destruction of the aircraft and death of all on-board. The FAA report concluded that type of accident represents a serious threat and that fuel tank inerting should be used to prevent future events of this type.

Inert gas generating systems have been used to protect against fuel tank explosions by replacing the potentially explosive fuel vapor/air mixture above the fuel in the ullage space of the tanks with an inert gas. Inert gas generating systems that provide nitrogen gas have been described. Nitrogen gas does not support fuel vapor oxidation and represents the current best method for on-board generation of an inert gas. Nitrogen can be separated from air using membrane, pressure swing adsorption (PSA), or temperature swing adsorption (TSA). Although these systems require energy to function, they do provide an adequate approach to fuel tank inerting for some applications.

Inert gas generating systems that provide carbon dioxide have been described. U.S. Pat. No. 3,899,099 discloses a system for providing carbon dioxide to tankers. The described system uses a portion of the flue gas from the ship's boiler. Flue gas is a carbon dioxide-rich gas produced by normal, non-catalytic combustion. The flue gas is scrubbed with sea water to remove sulfur dioxide. The scrubbed flue gas is then used for the cargo tanks. Although the described system can provide an inert gas, it requires a boiler or other non-catalytic combustor for fuel oxidation. The described system is unsuitable for some applications because the combustor has limited temperature and compositional ranges and because the combustor requires large, heavy heat exchangers. Additionally, the described system is impractical for some applications because sea water is required to remove the sulfur dioxide from the flue gas.

An inert gas generating system that does not require sea water to remove the sulfur dioxide is disclosed in Japanese Patent No. JP 11-105784. In the described system, sulfur oxides are removed from the flue gas by a desulfurizer. The desulfurized flue gas is then mixed with high purity nitrogen to provide the inert stream. Although the described system may be more practical than the systems that use aqueous solutions to remove the sulfur compounds, it requires a non-catalytic combustor and a supply of high purity nitrogen.

Other carbon dioxide inerting systems generate the inert gas by catalytic combustion of fuel to form carbon dioxide. Carbon dioxide can be easily generated by reacting a small amount of fuel with oxygen in an air stream, and then removing the water that is co-generated. However, some fuels, such as liquid jet fuel, have the disadvantage of containing a substantial amount of sulfur-containing components. The presence of sulfur compounds causes the conversion of the sulfur moiety into sulfur oxides such as sulfur dioxide and sulfur trioxide. These compounds react with water, which is ubiquitous, to form acidic compounds such as sulfuric acid and sulfurous acid. These acids are generally incompatible with metals such as aluminum and aluminum alloys that are used in the construction of fuel tanks and other related components.

As can be seen, there is a need for improved gas generating systems. An inert gas generating system using jet fuel is needed wherein the problems associated with the presence of sulfur compounds are reduced. A carbon dioxide generating system is needed wherein the generated gas has a reduced concentration of sulfur compounds.

SUMMARY OF THE INVENTION

In one aspect of the present invention, a carbon dioxide generating system comprises a catalytic reactor; and a sulfur separator sub-system in flow communication with the catalytic reactor.

In another aspect of the present invention, an inert gas generating system comprises at least one adsorption column; a catalytic reactor in flow communication with the adsorption column, the catalytic reactor designed to provide a first portion of outlet flow and a second portion of outlet flow; and a regeneration sub-system positioned between and in flow communication with the catalytic reactor and the adsorption column, the regeneration sub-system adapted to direct the second portion of outlet flow to the adsorption column.

In a further aspect of the present invention, a carbon dioxide generating system comprises an evaporator; a sulfur separator sub-system in fluid communication with the evaporator, the sulfur separator sub-system designed to receive a supply of fuel from the evaporator and designed to provide a desulfurized flow; and a catalytic reactor sub-system in fluid communication with the sulfur separator sub-system, the catalytic reactor sub-system designed to receive the desulfurized flow and designed to provide a first portion of outlet flow and a second portion of outlet flow.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides gas generating systems and methods for using the same. Embodiments of the present invention may find beneficial use in industries such as aerospace, electricity generation and automotive industries. Embodiments of the present invention may be useful in applications including inerting fuel tanks and other compartments, such as cargo holds. Embodiments of the present invention may be useful in any gas generating application including, but not limited to, on-board carbon dioxide gas generating systems for aircraft.

In one embodiment, the present invention provides a gas generating system. Unlike the prior art systems that comprise a non-catalytic combustor, the systems of the present invention can include a catalytic reactor. The advantages of a catalytic reactor is that it can be used over a wider temperature range, a wider compositional range, and may require smaller and lighter heat exchangers relative to the non-catalytic combustor. Unlike the prior art systems that include a catalytic reactor, the present invention can include a sulfur separator sub-system. Embodiments of the sulfur separator sub-system can include an adsorption bed or a permeable membrane (PM) to reduce the sulfur compounds of the generated inert gas. Further unlike the prior art, embodiments of the present invention can include a regeneration sub-system. The regeneration sub-system can use a portion of the hot gas generated by the catalytic reactor to desorb the adsorbed sulfur compounds from the adsorption bed, which is unlike the prior art that does not use regeneration sub-systems.

Figure 1A:
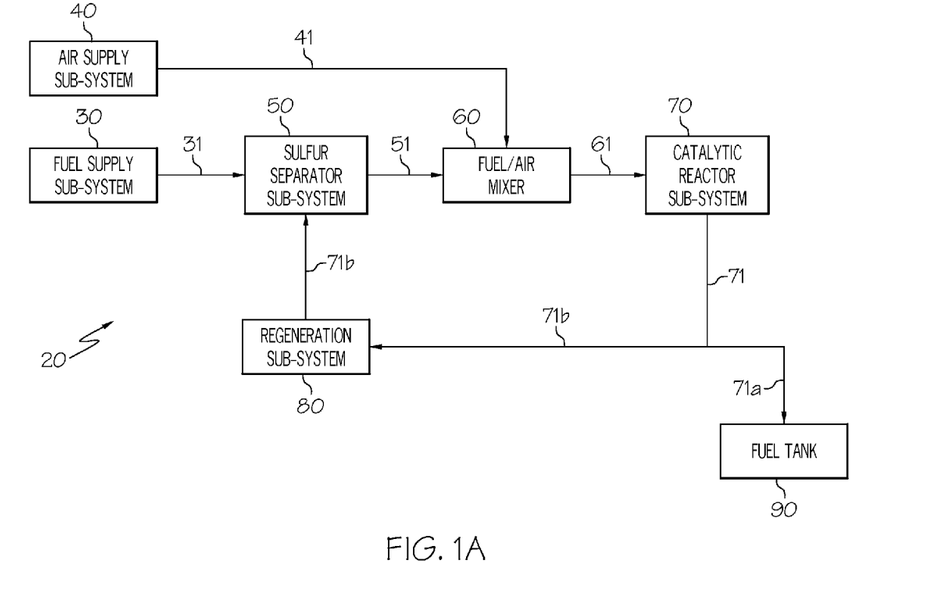
FIG. 1a is an overview diagram of a gas generating system according to one embodiment of the present invention.

In one embodiment, the present invention may include a gas generating system 20 as depicted in FIG. 1a. The system 20 can include a fuel supply sub-system 30, an air supply sub-system 40, a sulfur separator sub-system 50, a fuel/air mixer 60, a catalytic reactor 70, and a regeneration sub-system 80. The fuel supply sub-system 30 can provide a supply of fuel 31 to the sulfur separator sub-system 50. The sulfur separator sub-system 50 can receive the fuel 31 from the fuel supply sub-system 30 and provide a supply of desulfurized flow 51 to the fuel/air mixer 60. The fuel/air mixer 60 can receive the desulfurized flow 51 from the sulfur separator sub-system 50, receive a supply of air 41 from the air supply sub-system 40, and provide a fuel/air mixture 61 to the catalytic reactor sub-system 70. The catalytic reactor sub-system 70 can receive the fuel/air mixture 61 and provide a supply of outlet flow 71. A first portion of outlet flow 71a can be directed towards a chamber in need of inerting, such as a fuel tank 90, and a second portion of the outlet flow 71b can be directed towards the regeneration sub-system 80. The regeneration sub-system 80 can direct the second portion of the outlet flow 71b towards the sulfur separator sub-system 50 for sulfur compound desorption.

Figure 1B:
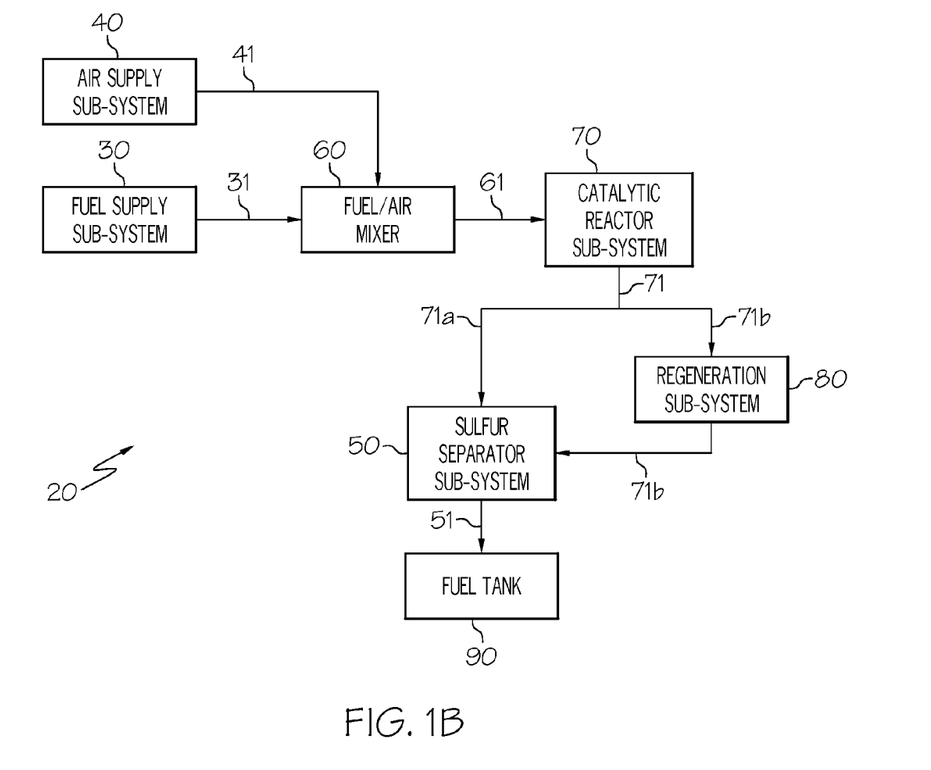
FIG. 1b is an overview diagram of a gas generating system according to another embodiment of the present invention.

In an alternate embodiment, as depicted in FIG. 1b, the fuel supply sub-system 30 can provide the supply of fuel 31 to the fuel/air mixer 60. The fuel/air mixer 60 can receive the fuel 31 from the fuel supply sub-system 30, receive the supply of air 41 from the air supply sub-system 40, and provide the fuel/air mixture 61 to the catalytic reactor sub-system 70. The catalytic reactor sub-system 70 can receive the fuel/air mixture 61 and provide the supply of outlet flow 71. The first portion of outlet flow 71a can be directed to the sulfur separator sub-system 50. The sulfur separator sub-system 50 can receive the first portion of outlet flow 71a and provide the supply of desulfurized flow 51. In this embodiment, the desulfurized flow 51 may be directed to the chamber in need of inerting (fuel tank 90). The second portion of the outlet flow 71b can be directed to the regeneration sub-system 80. The regeneration sub-system 80 can direct the second portion of the outlet flow 71b towards the sulfur separator sub-system 50 for sulfur compound desorption.

Figure 2:
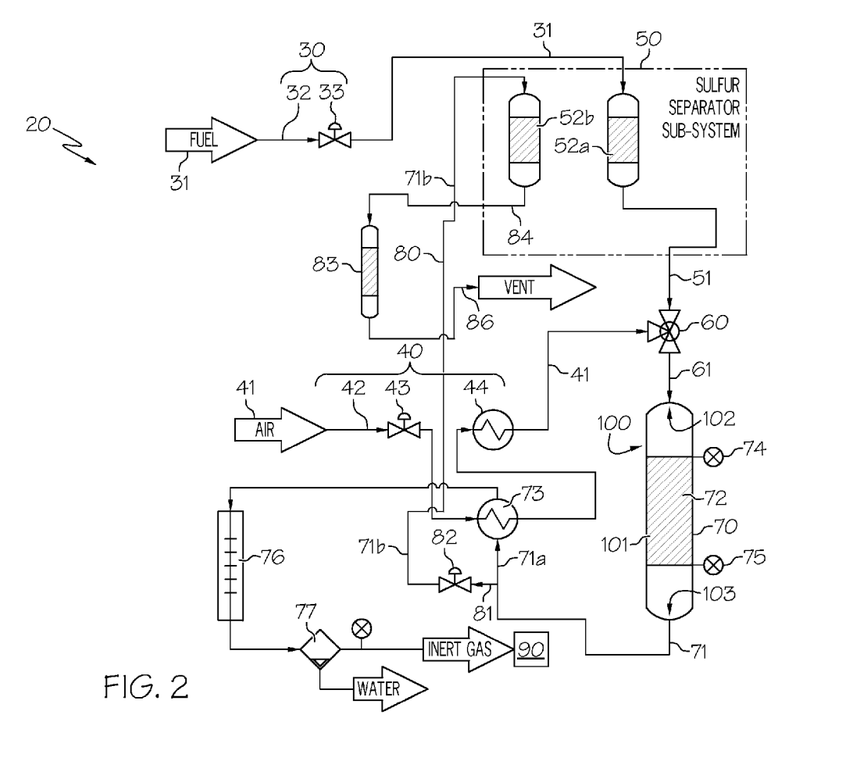
FIG. 2 is a diagram of a gas generating system according to one embodiment of the present invention.

For some embodiments, the fuel supply sub-system 30 may comprise a fuel line 32 and a fuel valve 33 operationally connected to the fuel line 32, as depicted in FIG. 2. The fuel line 32 may be positioned between and in flow communication with the sulfur separator sub-system 50 and a fuel source (not shown), such as a fuel transfer pump. The fuel line 32 may be designed such that the supply of fuel 31 can flow from the fuel source to the sulfur separator sub-system 50. Alternatively, the fuel supply sub-system 30 may be designed such that the supply of fuel 31 can flow from the fuel source to the fuel/air mixer 60, as depicted in FIG. 1b. The fuel valve 33, depicted in FIG. 2, may be used to control the flow of the fuel 31. The fuel flow rate may be metered by the fuel valve 33 to provide sufficient fuel for generation of a desired carbon dioxide concentration. For some embodiments, as depicted in FIG. 2, the fuel supply sub-system 30 may provide the fuel 31 in liquid phase. In alternate embodiments, depicted in FIGS. 3-5, the fuel supply sub-system 30 may provide the fuel 31 in vapor phase.

Figure 3:
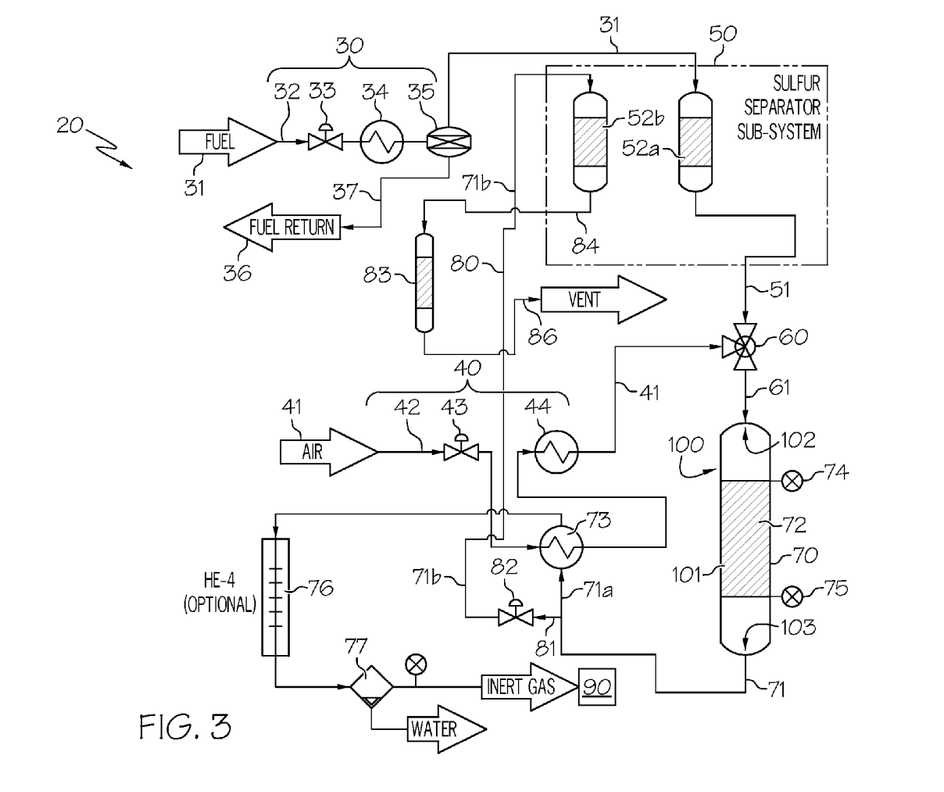
FIG. 3 is a diagram of a gas generating system according to another embodiment of the present invention.
Figure 5:
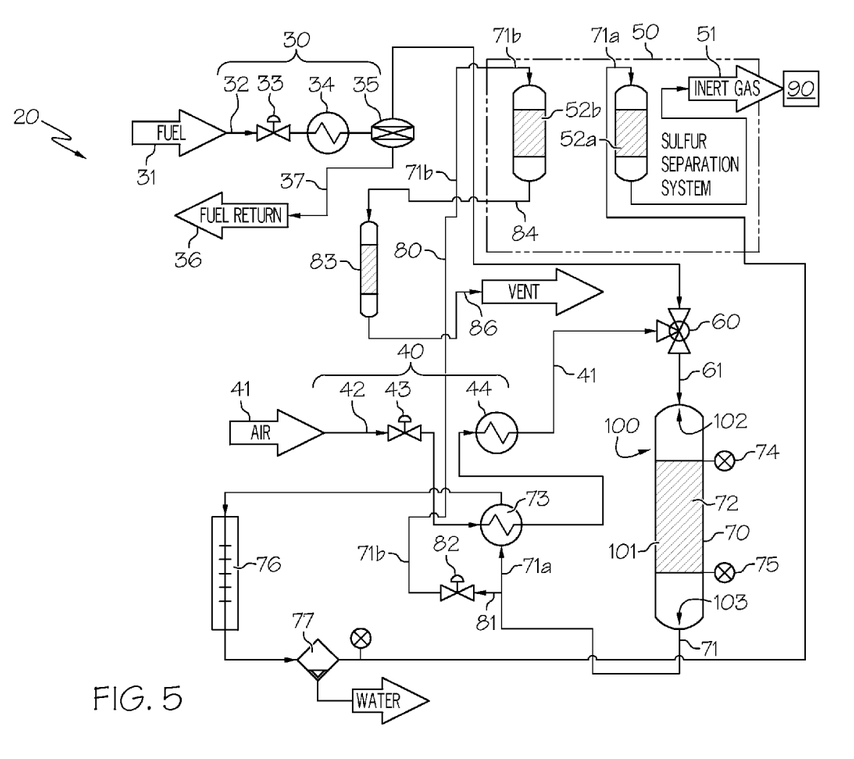
FIG. 5 is a diagram of a gas generating system according to another embodiment of the present invention.

For some embodiments that provide the fuel 31 in vapor phase, the fuel supply sub-system 30 may comprise the fuel line 32, the fuel valve 33, a fuel heater 34 and an evaporator 35, as depicted in FIGS. 3 and 5. The fuel heater 34 and the evaporator 35 each may be positioned downstream from the fuel valve 33 and operationally connected to the fuel line 32. For these embodiments, the fuel 31 may be taken from the discharge side of a fuel pump (not shown), metered through the fuel valve 33, heated by the fuel heater 34, and conducted through the fuel line 32 to the evaporator 35. The fuel heater 34 may elevate the temperature of the fuel 31 to a temperature sufficient to provide a controlled hydrocarbon partial pressure to generate the outlet flow 71. The fuel heater 34 may use electrical energy to heat the fuel 31. Alternatively, the fuel heater 34 may use hot air. In another alternative embodiment, the fuel heater 34 may be operationally connected to a secondary cooling heat exchanger 76 (discussed below). The fuel heater 34 may be designed to control the temperature of either the liquid fuel or the vapor fuel in the evaporator 35.

The evaporator 35, as depicted in FIGS. 3 and 5, may vaporize a small portion of the fuel 31 and return a remaining liquid fraction 36 through a fuel return line 37 to the fuel source. Useful fuel supply sub-systems 30 that comprise evaporators 35 may include the systems described in U.S. patent application Ser. No. 11/560,290, which was filed on Nov. 15, 2006, which is incorporated herein by reference. For applications wherein the vapor pressure of the fuel is very low, as under conditions of very low ambient temperature, the evaporator 35 may be useful in providing an adequate fuel concentration for carbon dioxide generation. Incorporation of the evaporator 35 may provide a constant and controlled amount of the fuel 31 that can be converted into carbon dioxide while maintaining the advantage associated with using the relatively lower-boiling fraction of the fuel 31.

Figure 4:
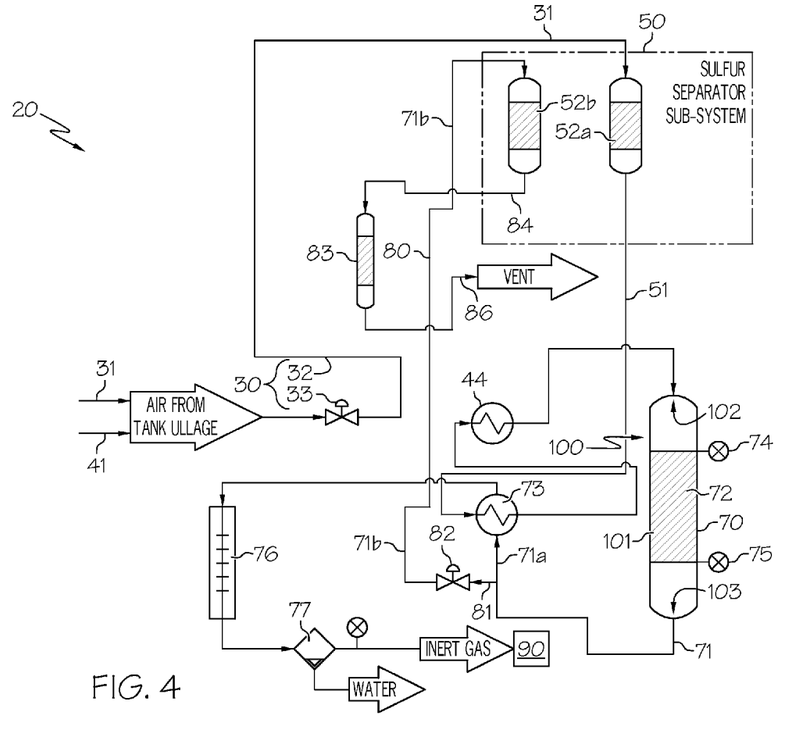
FIG. 4 is a diagram of a gas generating system according to another embodiment of the present invention.

For alternate embodiments that provide the fuel 31 in vapor phase, the fuel line 32 may in fluid communication with the ullage of the fuel tank 90, as depicted in FIG. 4. In these embodiments, the fuel supply sub-system 30 may provide both the supply of fuel 31 and the supply of air 41. For these embodiments the fuel line 32 may be designed such that the supply of fuel 31 and the supply of air 41 both can flow from the ullage space to the sulfur separator sub-system 50, as depicted in FIG. 4. Alternatively, the fuel line 32 may be designed such that the supply of fuel 31 and the supply of air 41 both can flow from the ullage space to the catalytic reactor 70. For embodiments wherein the fuel line 32 is in fluid communication with the ullage of the fuel tank 90, it may be unnecessary to include the air supply sub-system 40 and the fuel/air mixer 60.

For some embodiments, the air supply sub-system 40 may comprise an air line 42, an air valve 43 and an air heater 44, as depicted in FIGS. 2, 3 and 5. The air valve 43 and the air heater 44 both may be operationally connected to the air line 42. The air line 42 may be positioned between and in flow communication with the fuel/air mixer 60 and an air source (not shown), such as bleed air. The air line 42 may be designed such that the supply of air 41 can flow from the air source to the fuel/air mixer 60. The air valve 43 may be used to control the flow of the air 41 such that a specified quantity of inert gas is provided by the system 20. The air heater 44 may heat the air 41 before the air 41 is directed to the fuel/air mixer 60. For some embodiments, such as the embodiment depicted in FIG. 4, it may not be necessary to include the air line 42 and air valve 43 because the fuel supply sub-system 30 may provide the supply of air 41. However, these systems 20 may include the air heater 44, as depicted in FIG. 4, to heat the desulfurized flow 51 before the desulfurized flow 51 is directed to the catalytic reactor sub-system 70.

For some embodiments, the sulfur separator sub-system 50 may be designed to receive the supply of fuel 31 from the fuel supply sub-system 30, as depicted in FIG. 1a. In alternate embodiments, the sulfur separator sub-system 50 may be designed to receive the first portion of outlet flow 71a from the catalytic reactor sub-system 70, as depicted in FIG. 1b.

For some embodiments, the sulfur separator sub-system 50 may be in flow communication with and designed to receive the supply of fuel 31 from the fuel supply sub-system 30, as depicted in FIGS. 2 and 3. For some embodiments, the sulfur separator sub-system 50 may be designed to reduce the sulfur components of the fuel 31 by at least about 90%. For some embodiments, the sulfur separator sub-system 50 may be designed to reduce the sulfur components of the fuel 31 by between about 90% and about 99.9%. In an alternate embodiment, the sulfur separator sub-system 50 may be in flow communication with and designed to receive both the supply of fuel 31 and the supply of air 41 from the fuel supply sub-system 30, as depicted in FIG. 4. In another alternate embodiment, the sulfur separator sub-system 50 may be in flow communication with and designed to receive the first portion of outlet flow 71a from the catalytic reactor sub-system 70, as depicted in FIG. 5. For some embodiments, the sulfur separator sub-system 50 may be designed to reduce the sulfur components of the first portion of outlet flow 71a by at least about 90%. For some embodiments, the sulfur separator sub-system 50 may be designed to reduce the sulfur components of the first portion of outlet flow 71a by between about 90% and about 99.9%.

The sulfur separator sub-system 50 may be based on permeable membrane (PM), temperature swing adsorption (TSA), pressure swing adsorption (PSA), or a combination of PSA/TSA. Useful sulfur separator sub-systems 50 may include the sulfur separation systems described in U.S. Pat. No. 6,887,381, which is incorporated herein by reference. For some embodiments, as depicted in FIGS. 2-4, the sulfur separator sub-system 50 may be designed to remove sulfur compounds, such as mercaptans, thiophenes, benzthiophenes, hindered thiophenes, di-sulfides, and other sulfur-containing structures, from the fuel 31. Alternatively, the sulfur separator sub-system 50 may be designed to remove sulfur compounds in their oxidized forms, such as sulfur dioxide, sulfur trioxide and sulfur-containing acids, from the outlet flow 71a from the catalytic reactor sub-system 70, as depicted in FIG. 5.

The PM based sulfur separator sub-systems may include a bundle of hollow fiber membranes positioned within a housing. The membrane option may be best used for the stream after catalytic oxidation. The first portion of outlet flow 71 may enter the housing and pass through the bundle of hollow fiber membranes. Sulfur compounds may be separated from the first portion of outlet flow 71 due to diffusion through the fiber walls because the fiber walls may be less permeable to sulfur compounds than to carbon dioxide and other air components. As the first portion of outlet flow 71 travels through the sulfur separation sub-system 50, the sulfur compounds may be filtered out since they pass through the membrane less easily, generating the desulfurized flow 51. Alternatively, the PM based system may comprise a plate and frame or a spiral wound configuration in lieu of the hollow fiber configuration. PM based systems may comprise polymeric materials, such as polyimides, polysulfones, polyamides, polycarbonates, and polyphenylethers. PM based systems may comprise a material that is stable at the operating temperatures of the sulfur separator sub-system 50 and stable when in contact with the components of the fuel 31.

Permeation through a membrane is generally considered to be the product of diffusivity through the membrane and solubility in the membrane material ($P=D*S$). For the polymers we have cited, which all have the advantage that they can be used at higher temperatures, the diffusion contribution is dominant. Diffusion through a membrane is generally inversely related to the molecular volume of the permeant (i.e. the larger molecules diffuse more slowly). Additional information on membranes can be found in R. W. Baker "Membrane Technology and Applications" (2004). The van der Waal's volumes for gases of interest in this application include oxygen (31.9 cc/mol), nitrogen (38.7 cc/mol), carbon dioxide (42.9 cc/mol) and sulfur dioxide (56.8 cc/mol). We therefore can see that a stream containing nitrogen, carbon dioxide and sulfur dioxide would be purified by passing through the membrane via removal of the sulfur dioxide. If oxygen were also present, however, it would permeate in preference to all other components. Therefore the oxygen may be substantially removed before this process.

In another embodiment, membrane materials may be chosen which show higher permeability for the sulfur compounds than for the other inert gas components. Based on the previous discussion, it will be apparent that these membrane materials will separate on the basis of solubility, and that the membrane materials will separate because the sulfur compounds are more soluble in the polymers chosen than other components. An example of such a material is natural rubber. This method of separating sulfur compounds may be less preferred, since such polymers are not stable at higher temperatures.

The PSA and TSA based sulfur separator sub-systems may include at least one adsorption column 52a,b, as depicted in FIGS. 2-5. The adsorption column 52a,b may comprise a housing and an adsorbent material disposed within the housing. The fuel 31 (see FIGS. 2 and 3), a combination of the fuel 31 and the air 41 (see FIG. 4), or the first portion of outlet flow 71*a* (see FIG. 5) may enter the housing and pass through the adsorbent material. Sulfur compounds may be adsorbed from the fuel 31 (or the first portion of the outlet flow 71*a*) by the adsorbent material as the fuel 31 (or the first portion of outlet flow 71*a*) passes through the adsorption column 52*a,b*. Useful adsorbent materials may include, but are not limited to, gamma alumina, eta alumina, silica gel, activated carbon, zeolites, titania, or mixed oxides. The number of adsorption columns 52*a,b* may vary and may depend on factors including the composition of the fuel 31 (or the outlet flow 71), dimensional limitations of the system 20, the desired flow rate and the particular application of the system 20. For some applications, there may be at least two adsorptions column 52*a,b* so that at least one column is in an adsorption cycle while another column is in a desorption cycle.

Figure 6:
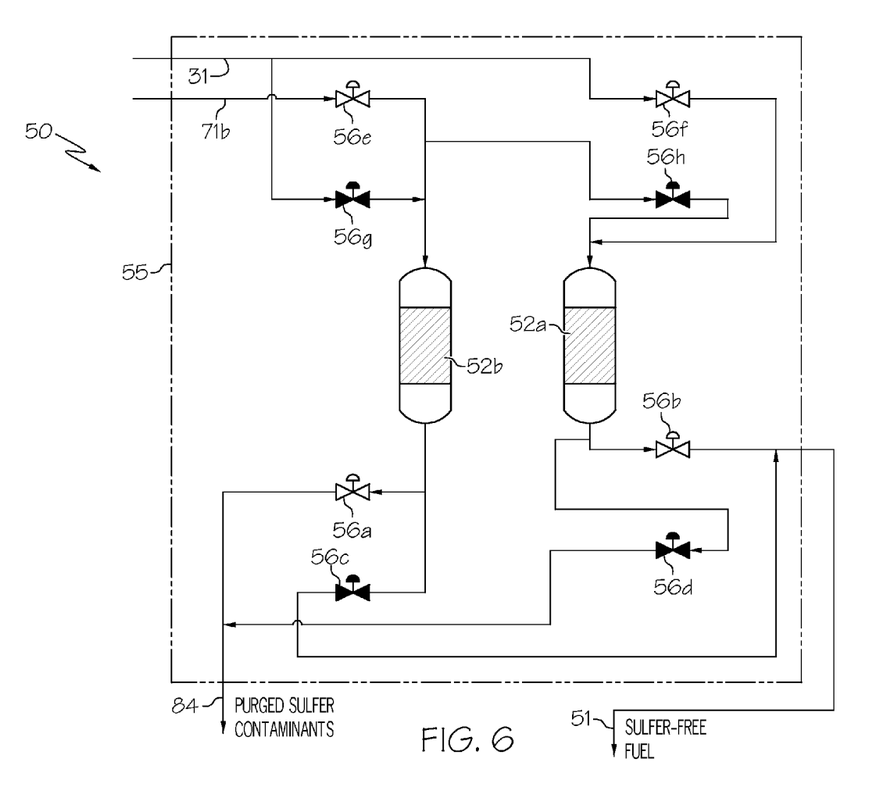
FIG. 6 is a close up view of a valve system according to another embodiment of the present invention.

The sulfur separator sub-system 50 may include a valve system 55 adapted to switch the operation of two or more adsorbent columns to configure a swing-bed system, as depicted in FIG. 6. The valve system 55 may comprise a plurality of valves 56*a-h*. For each adsorption column 52*a,b*, two of the valves 56*a-h* may control the flow into and another two of the valves 56*a-h* may control the flow out of each adsorption column 52*a,b*. For example, in the embodiment depicted in FIG. 6, when the valves 56*a*, 56*b*, 56*e*, and 56*f* are in the open position and the valves 56*c*, 56*d*, 56*g* and 56*h* are in the closed position the adsorption column 52*a* may receive the fuel 31 and the adsorption column 52*b* may receive the second portion of the outlet flow 71*b*. In other words, the adsorption column 52*a* may be in an adsorption cycle and may provide the desulfurized flow 51, and the adsorption column 52*b* may be in a desorption cycle and may provide a purge flow 84. The purge flow 84 may comprise the sulfur contaminants desorbed from the adsorption column 52*a,b* during the desorption cycle. The valves may be individual or may be combined or ganged into integrated or multiport valve systems.

Figure 7:
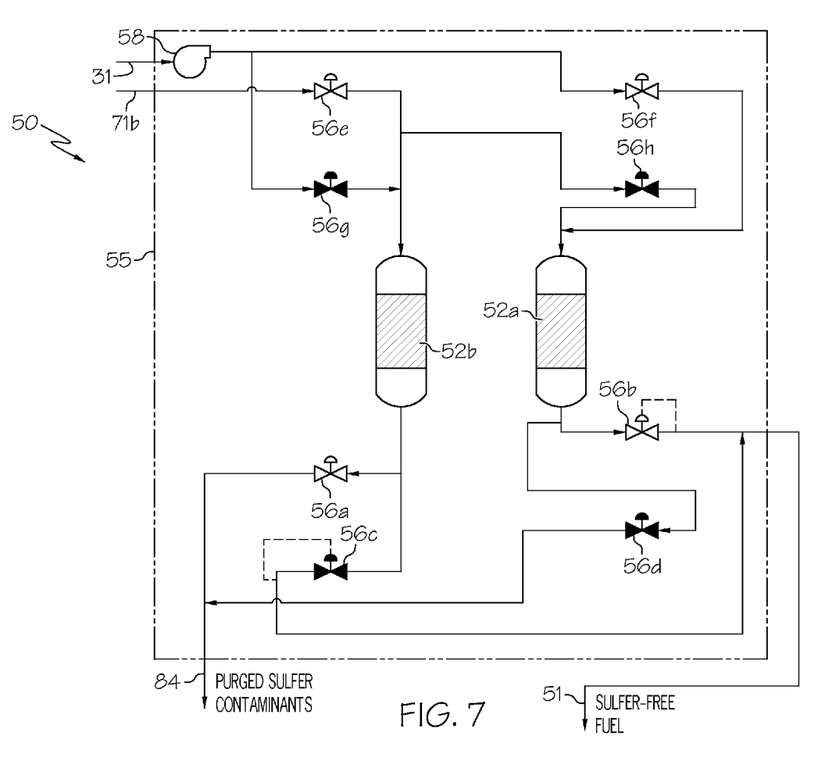
FIG. 7 is a close up view of a pressure swing system according to another embodiment of the present invention.

The PSA based sulfur separator sub-systems may include a compressor 58, as depicted in FIG. 7. For PSA based systems, the compressor 58 can be designed to increase the pressure of the flow during the adsorption cycle. For example, the sulfur separation sub-system 50 can be designed such that the adsorption cycle operates at about 60 psia pressure and the desorption cycle operates at ambient pressure.

The TSA based sulfur separator sub-systems may be designed such that the adsorption cycle operates at a lower temperature, for example between about 0° C. and about 40° C., and the desorption cycle operates at a higher temperature, for example between about 80° C. and about 150° C. For the embodiment depicted in FIG. 2, the fuel 31 may provide the lower temperature for the adsorption cycle and the hot exhaust gas (the second portion of the outlet flow 71*b*) from the catalytic reactor sub-system 70 may provide the higher temperature for the desorption cycle. For the embodiment depicted in FIG. 5, the first portion of outlet flow 71*a* may provide the lower temperature for the adsorption cycle and the second portion of the outlet flow 71*b* may provide the higher temperature for the desorption cycle. The first portion of outlet flow 71*a* may be at a lower temperature relative to the second portion of the outlet flow 71*b* because the first portion of outlet flow 71*a* may be in thermal contact with a recuperator heat exchanger 73 (discussed below). The sulfur separator sub-system 50 may be designed to supply the desulfurized flow 51.

The fuel/air mixer 60 may be designed to receive the desulfurized flow 51 from the sulfur separator sub-system 50 and the air 41 from the air supply sub-system 40, as depicted in FIGS. 1*a*, 2 and 3. Alternatively, the fuel/air mixer 60 may be designed to receive the fuel 31 from the fuel supply sub-system 30 and the air 41 from the air supply sub-system 40, as depicted in FIGS. 1*b* and 5. For some embodiments, as depicted in FIG. 4, the fuel/air mixer 60 may not be included. The fuel/air mixer 60 may provide a fuel/air mixture 61. The fuel air mixture 61 may comprise a mixture of the desulfurized flow 51 and the air 41, as depicted in FIGS. 1*a*, 2 and 3. Alternatively, the fuel/air mixture may comprise a mixture of the fuel 31 and the air 41, as depicted in FIGS. 1*b* and 5.

The catalytic reactor sub-system 70 may receive the fuel/air mixture 61 from the fuel/air mixer 60, as depicted in FIGS. 2, 3 and 5. Alternatively, the catalytic reactor sub-system 70 may receive both the fuel 31 and the air 41 from the fuel supply sub-system 30, as depicted in FIG. 4. The catalytic reactor sub-system 70, as depicted in FIGS. 2-5 may include a catalytic reactor 72, the recuperator heat exchanger 73, a reactor inlet temperature indicator 74 and a reactor outlet temperature indicator 75.

The catalytic reactor 72 may comprise a vessel 100 filled or partially filled with a catalytic composition 101 for oxidizing at least a portion of the fuel 31 or the desulfurized flow 51 to carbon dioxide. Useful catalytic reactors 72 may include the catalytic reactors described in U.S. Pat. No. 3,847,298, which is incorporated herein by reference. Useful catalytic compositions generally may be comprised of a metallic component supported on a ceramic support, and may include metals, metal compounds, or mixtures containing platinum, palladium, nickel, chromium, cobalt, tungsten, molybdenum, or in general group 8B. Suitable supports for these metal-containing compounds include alumina, titania, silica, zeolites, or other ceramic materials. The catalytic reactor 72 may provide the outlet flow 71. The first portion of outlet flow 71*a* may be directed to the recuperator heat exchanger 73.

The recuperator heat exchanger 73 may be in flow communication with the catalytic reactor 72 and may receive the first portion of outlet flow 71*a*. The recuperator heat exchanger 73 may be in thermal contact with the supply of air 41, as depicted in FIGS. 2, 3 and 5. In these embodiments, the recuperator heat exchanger 73 may cool the first portion of outlet flow 71*a* and may heat the supply of air 41. The recuperator heat exchanger 73 may transfer a fraction of the heat generated by reacting the fuel 31 to the air 41 and thereby reduce the energy input required by the air heater 44. Alternatively, the recuperator heat exchanger 73 may be in thermal contact with the desulfurized flow 51, as depicted in FIG. 4. In this embodiment, the recuperator heat exchanger 73 may cool the first portion of outlet flow 71*a* and may heat the desulfurized flow 51.

The first portion of outlet flow 71*a* may be directed from the recuperator heat exchanger 73 and to the optional secondary cooling heat exchanger 76 for further cooling. The secondary cooling heat exchanger 76 may be a finned tube, a cooled-liquid cooling stream contactor, or a ram-air cooler. The secondary cooling heat exchanger 76 may further reduce the temperature of the first portion of outlet flow 71*a*. For some embodiments, the secondary cooling heat exchanger 76 may be operationally connected to the fuel heater 34.

The first portion of outlet flow 71*a* then may be directed to a water separator 77 to remove water from the first portion of outlet flow 71*a*. The water separator 77 may be designed to remove condensed water from the first portion of outlet flow 71*a* to avoid introducing water into the fuel tank 90. For some embodiments, the first portion of outlet flow 71*a* then may be directed to the chamber in need of inerting (fuel tank 90), as depicted in FIGS. 2-4. Alternatively, the first portion of outlet flow 71*a* then may be directed to the sulfur separator sub-system 50, as depicted in FIG. 5.

The reactor inlet temperature indicator 74 may be a sensor operationally connected to the catalytic reactor 72 and designed to measure the temperature at a reactor inlet 102. In some embodiments, the reactor inlet temperature may be adjusted by energy input to heat the fuel 31, the air 41 or a mixture thereof. The reactor outlet temperature indicator 75 may be a sensor operationally connected to the catalytic reactor 72 and designed to measure the temperature at a reactor outlet 103. For some embodiments, the difference in temperature between the reactor inlet temperature indicator 74 and the reactor outlet temperature indicator 75 may be used to control the amount of fuel 31 introduced into the catalytic reactor 72.

The second portion of outlet flow 71b from the catalytic reactor 72 may be directed to the regeneration sub-system 80. The regeneration sub-system 80 may comprise a regeneration line 81 and a regeneration valve 82 operationally connected to the regeneration line 81. The regeneration line 81 may be designed to direct the second portion of outlet flow 71b to the sulfur separation sub-system 50 for sulfur desorption. The regeneration valve 82 may meter the necessary amount of hot regeneration gas (second portion of outlet gas 71b) to the sulfur separator sub-system 50. The second portion of the outlet 71b may pass through the sulfur separator sub-system 50. The second portion of the outlet 71b may desorb sulfur compounds from the sulfur separator sub-system 50 to provide the purge flow 84. The purge flow 84 may be vented overboard or passed through an optional reactor 83 for emission control. The second portion of the outlet 71b may supply all or at least a part of the heat needed for desorption. Additional heat for desorption cycle can be provided by other sources, such as engine exhaust, hot air, and electronics cooling bay. The energy required to regenerate the sulfur separator sub-system 50 can be obtained from the waste heat from the fuel oxidation, electrical heat from the aircraft, or any other source of heat sufficient to provide desorption.

Figure 8:
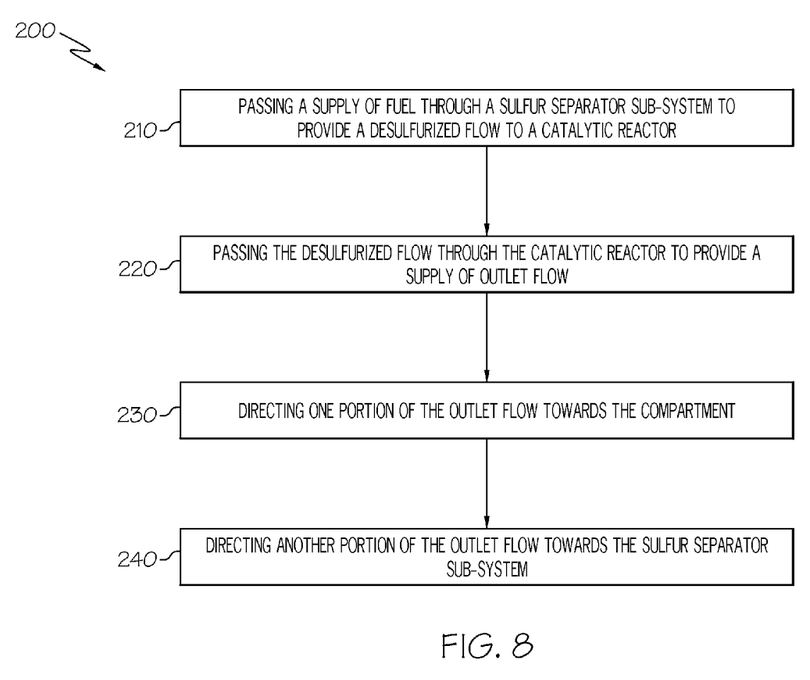
FIG. 8 is a flow chart of a method of providing an inert gas flow to a compartment according to an embodiment of the present invention.

A method 200 of providing an inert gas flow to a compartment, such as a fuel tank or a cargo hold, is depicted in FIG. 8. The method 200 may comprise a step 210 of passing a supply of fuel 31 through a sulfur separator sub-system 50 to provide a desulfurized flow 51 to a catalytic reactor 70; a step 220 of passing the desulfurized flow 51 through the catalytic reactor 70 to provide a supply of outlet flow 71; a step 230 of directing one portion of the outlet flow 71a towards the compartment; and a step 240 of directing another portion of the outlet flow 71b towards the sulfur separator sub-system 50. The step 210 of passing a supply of fuel 31 through a sulfur separator sub-system 50 may comprise passing the supply of fuel 31 through a sulfur separator sub-system 50 in liquid phase. The step 210 of passing a supply of fuel 31 through a sulfur separator sub-system 50 may comprise passing the supply of fuel 31 through a sulfur separator sub-system 50 in vapor phase. The step 210 of passing a supply of fuel 31 through a sulfur separator sub-system 50 to provide a desulfurized flow 51 to a catalytic reactor 70 may comprise passing the fuel 31 such that sulfur compounds are adsorbed by the sulfur separator sub-system 50. The step 240 of directing another portion of the outlet flow 71b towards the sulfur separator sub-system 50 may include passing the outlet flow 71b through the sulfur separation sub-system 50 to regenerate the sulfur separation sub-system 50 by desorbing the adsorbed sulfur compounds.

EXAMPLE 1

An embodiment of the system 20 is depicted in FIG. 2. In this example, the fuel 31 may be taken from the discharge side of a fuel pump, metered through the fuel valve 33 and then conducted (in liquid phase) to the adsorption column 52a, where sulfur-containing compounds are adsorbed onto a column of adsorbent. It is noteworthy that additional non-sulfur compounds such as polynuclear aromatics may also be retained but this represents only a reduction in total system efficiency. The desulfurized flow 51, which has substantially lower sulfur concentration than the fuel 31, is conducted to the fuel/air mixer 60. The supply of air 41 that has been collected from a bleed or compressor source, regulated by the air valve 43, heated by the recuperator heat exchanger 73, and heated by the air heater 44, is conducted to the fuel/air mixer 60. The combined fuel vapor and air stream has a composition well below the lower explosion limit of an air-fuel mixture and is conducted to the catalytic reactor 72. In the catalytic reactor 72, the admixture of air and vapor fuel is contacted with a suitable catalyst, which causes the fuel to be oxidized to carbon dioxide and water vapor. The first portion of the outlet flow 71a is conducted through the recuperative heat exchanger 73, through the optional secondary cooling heat exchanger 76 and to the water separator 77. After removing liquid water, the carbon-dioxide-rich gas is available for fuel tank inerting. A key part of this embodiment may be the sulfur separation sub-system 50. After the adsorption column 52a becomes saturated with sulfur compounds to the extent that it is unable to fully remove these compounds, it is reconfigured using the valves 56a-h (see FIG. 6) for regeneration. Generally, two or more adsorbent beds are used together in this type of purification system, with which a person skilled in the art will be quite familiar. The use of a regeneration treatment is illustrated as applied to the present invention using adsorption column 52b. The components of the regeneration sub-system 80 (regeneration valve 82 and the optional reactor 83) are key elements of the desulfurization desorption phase. In this example, and not obvious to a person of skill in the art, hot air having a reduced oxygen concentration relative to ambient air is collected from the hot reactor exhaust (the second portion of the outlet flow 71b) and conducted through the regeneration valve 82 to the inlet of the adsorption column 52b. The system 20 is controlled by use of a reactor inlet temperature indicator 74 and the fuel valve 33 to provide a sufficiently high temperature to desorb the compounds that were adsorbed onto the column during the adsorption phase described herein above for the adsorption column 52a. The desorbed sulfur-rich compounds are conducted to an optional catalytic reactor 83 designed to oxidize the organic compound or directly to the aircraft vent through a vent line 86.

EXAMPLE 2

This example (see FIG. 4) describes how the fuel 31 and the air 41 can be combined prior to removal of sulfur compounds in the adsorption column 52a. A mixture of fuel and air is taken from the fuel tank ullage, metered through the fuel valve 33 and conducted to the sulfur separator sub-system 50, where sulfur-containing compounds are adsorbed onto a column of adsorbent. As noted in Example 1, additional non-sulfur compounds such as polynuclear aromatics may also be retained but this represents only a reduction in total system efficiency. The desulfurized flow 51, which has substantially lower sulfur concentration than the mixture from the fuel tank ullage, is conducted to the recuperator heat exchanger 73. The desulfurized flow 51 is heated by the recuperator heat exchanger 73, heated by the air heater 44, and conducted to the catalytic reactor 72. The combined fuel vapor and air stream has a composition well below the lower explosion limit of an air-fuel mixture. In the catalytic reactor 72, the admixture of air and vapor fuel is contacted with a suitable catalyst, which causes the fuel to be oxidized to carbon dioxide and water vapor. The first portion of the outlet flow 71a is conducted through the recuperative heat exchanger 73, through the optional secondary cooling heat exchanger 76 and to the water separator 77. After removing liquid water, the carbon-dioxide-rich gas is available for fuel tank inerting. A key part of this embodiment may be the sulfur separation sub-system 50. After the adsorption column 52a becomes saturated with sulfur compounds to the extent that it is unable to fully remove these compounds, it is reconfigured using the valves 56a-h (see FIG. 6) for regeneration. Generally, two or more adsorbent beds are used together in this type of purification system. The use of a regeneration treatment is illustrated as applied to the present invention using adsorption column 52b. The components of the regeneration sub-system 80 (regeneration valve 82 and the optional reactor 83) are key elements of the desulfurization desorption phase. In this example, and not obvious to a person of skill in the art, hot air having a reduced oxygen concentration relative to ambient air is collected from the hot reactor exhaust (the second portion of the outlet flow 71b) and conducted through the regeneration valve 82 to the inlet of the adsorption column 52b. The system 20 is controlled by use of a reactor inlet temperature indicator 74 and the fuel valve 33 to provide a sufficiently high temperature to desorb the compounds that were adsorbed onto the column during the adsorption phase described herein above for the adsorption column 52a. The desorbed sulfur-rich compounds are conducted to an optional catalytic reactor 83 designed to oxidize the organic compound or directly to the aircraft vent through the vent line 86.

EXAMPLE 3

In this example (see FIG. 3), the fuel 31 may be taken from the discharge side of a fuel pump, metered through the fuel valve 33, heated in the fuel heater 34, and conducted to the evaporator 35, wherein a small fraction of the liquid fuel is vaporized. The remaining liquid fraction of the fuel is returned from the evaporator 35 to the fuel tank. The vapor phase from the evaporator 35 is conducted to the adsorption column 52a, where sulfur-containing compounds are adsorbed onto a column of adsorbent. As noted in Example 1, additional non-sulfur compounds such as polynuclear aromatics may also be retained but this represents only a reduction in total system efficiency. The desulfurized flow 51, which has substantially lower sulfur concentration than the fuel 31, is conducted to the fuel/air mixer 60. The supply of air 41 that has been collected from a bleed or compressor source, regulated by the air valve 43, heated by the recuperator heat exchanger 73, heated by the air heater 44, is conducted to the fuel/air mixer 60. The combined fuel vapor and air stream has a composition well below the lower explosion limit of an air-fuel mixture and is conducted to the catalytic reactor 72. In the catalytic reactor 72, the admixture of air and vapor fuel is contacted with a suitable catalyst, which causes the fuel to be oxidized to carbon dioxide and water vapor. The first portion of the outlet flow 71a is conducted through the recuperative heat exchanger 73, through an optional secondary cooling heat exchanger 76 and to the water separator 77. After removing liquid water, the carbon-dioxide-rich gas is available for fuel tank inerting. A key part of this embodiment may be the sulfur separation sub-system 50. After the adsorption column 52a becomes saturated with sulfur compounds to the extent that it is unable to fully remove these compounds, it is reconfigured using the valves 56a-h (see FIG. 6) for regeneration. Generally, two or more adsorbent beds are used together in this type of purification system. The use of a regeneration treatment is illustrated as applied to the present invention using adsorption column 52b. The components of the regeneration sub-system 80 (regeneration valve 82 and the optional reactor 83) are key elements of the desulfurization desorption phase. In this example, and not obvious to a person of skill in the art, hot air having a reduced oxygen concentration relative to ambient air is collected from the hot reactor exhaust (the second portion of the outlet flow 71b) and conducted through the regeneration valve 82 to the inlet of the adsorption column 52b. The system 20 is controlled by use of a reactor inlet temperature indicator 74 and the fuel valve 33 to provide a sufficiently high temperature to desorb the compounds that were adsorbed onto the column during the adsorption phase described herein above for the adsorption column 52a. The desorbed sulfur-rich compounds are conducted to an optional catalytic reactor 83 designed to oxidize the organic compound or directly to the aircraft vent through the vent line 86.

EXAMPLE 4

In this example (see FIG. 5), the fuel 31 may be taken from the discharge side of a fuel pump, metered through the fuel valve 33, heated in the fuel heater 34, and conducted to the evaporator 35, wherein a small fraction of the liquid fuel is vaporized. The remaining liquid fraction of the fuel is returned from the evaporator 35 to the fuel tank. The vapor phase from the evaporator 35 is conducted to the fuel/air mixer 60. The supply of air 41 that has been collected from a bleed or compressor source, regulated by the air valve 43, heated by the recuperator heat exchanger 73, and heated by the air heater 44, is conducted to the fuel/air mixer 60. The combined fuel vapor and air stream has a composition well below the lower explosion limit of an air-fuel mixture and is conducted to the catalytic reactor 72. In the catalytic reactor 72, the admixture of air and vapor fuel is contacted with a suitable catalyst, which causes the fuel to be oxidized to carbon dioxide and water vapor. The first portion of the outlet flow 71a is conducted through the recuperative heat exchanger 73, through the optional secondary cooling heat exchanger 76 and to the water separator 77. After removing liquid water, the carbon-dioxide-rich gas then is conducted to the adsorption column 52a, where sulfur-containing compounds are adsorbed onto a column of adsorbent. The desulfurized flow 51, which has substantially lower sulfur concentration than the first portion of outlet flow 71a, is available for fuel tank inerting. In alternate embodiments, the water separator 77 may be eliminated or the water separator 77 may be employed downstream of the adsorption column 52a. The second portion of the outlet flow 71b may be used for column regeneration as described for examples 1-3 above.

As can be appreciated by those skilled in the art, the present invention provides improved gas generating systems. Embodiments of the present invention may have the advantage of removing sulfur and reducing or eliminating the problems associated with the presence of sulfur oxides or sulfurous acids such as sulfuric and sulfurous acids on the fuel tank. Embodiments of the present invention may provide carbon dioxide generating systems for fuel tank inerting. The generated gas (first portion of outlet flow 71a in FIG. 1a, desulfurized flow 51 in FIG. 1b) may comprise a combination of carbon dioxide, oxygen, nitrogen and other trace gases. Some embodiments of the present invention may provide a generated gas having an oxygen concentration of less than about 12% (by volume). For some embodiments, the generated gas could be about 12% oxygen, about 9% carbon dioxide, and about 79% nitrogen and other gases. For some embodiments, the carbon dioxide concentration of the generated gas may be about 21% (oxygen concentration then may be about 0%).

It should be understood, of course, that the foregoing relates to exemplary embodiments of the invention and that modifications may be made without departing from the spirit and scope of the invention as set forth in the following claims.

We claim:

1. A carbon dioxide generating system comprising:
a catalytic reactor;
a sulfur separator sub-system positioned in flow communication with said catalytic reactor to receive a desulfurized outlet flow from said catalytic reactor; and
a regeneration line positioned between the sulfur separator sub-system and said catalytic reactor to direct the desulfurized outlet flow to the sulfur separator sub-system.

2. The carbon dioxide generating system of claim 1, wherein said sulfur separator sub-system includes at least one adsorption column.

3. The carbon dioxide generating system of claim 1, further comprising a fuel supply sub-system in flow communication with said catalytic reactor.

4. The carbon dioxide generating system of claim 3, wherein said fuel supply sub-system includes an evaporator.

5. The carbon dioxide generating system of claim 3, wherein said carbon dioxide generating system is designed to inert a fuel tank; and wherein said fuel supply sub-system is in flow communication with the ullage space of said fuel tank.

6. The carbon dioxide generating system of claim 1, wherein said sulfur separator sub-system includes a permeable membrane.

7. The carbon dioxide generating system of claim 1, wherein said sulfur separator sub-system is designed to provide a desulfurized flow to said catalytic reactor.

8. The carbon dioxide generating system of claim 1, wherein said catalytic reactor is designed to provide a first portion of outlet flow to said sulfur separator sub-system.

9. The carbon dioxide generating system of claim 1, further comprising an air line in flow communication with said catalytic reactor.

10. The carbon dioxide generating system of claim 1, wherein said sulfur separator sub-system includes a compressor.

11. An inert gas generating system comprising:
at least one adsorption column;
a catalytic reactor in flow communication with said adsorption column, said catalytic reactor designed to provide a first portion of outlet flow and a second portion of outlet flow; and
a regeneration sub-system positioned between and in flow communication with said catalytic reactor and said adsorption column, said regeneration sub-system adapted to direct said second portion of outlet flow to said adsorption column.

12. The inert gas generating system of claim 11, wherein said regeneration sub-system comprises a regeneration line and a regeneration valve operationally connected to said regeneration line.

13. The inert gas generating system of claim 11, further comprising a recuperator heat exchanger designed to receive said first portion of outlet flow.

14. The inert gas generating system of claim 11, further comprising a water separator designed to receive said first portion of outlet flow.

15. A carbon dioxide generating system comprising:
an evaporator;
a sulfur separator sub-system in fluid communication with said evaporator, said sulfur separator sub-system designed to receive a supply of fuel from said evaporator and designed to provide a desulfurized flow;
a catalytic reactor sub-system in fluid communication with said sulfur separator sub-system, said catalytic reactor sub-system designed to receive said desulfurized flow and designed to provide a first portion of outlet flow and a second portion of outlet; and
a regeneration line positioned between said sulfur separator sub-system and said catalytic reactor sub-system, said regeneration line designed to direct said second portion of outlet flow to said sulfur separator sub-system.

16. The carbon dioxide generating system of claim 15, further comprising an air supply sub-system in flow communication with said catalytic reactor sub-system.

17. The carbon dioxide generating system of claim 16, wherein said air supply sub-system is in thermal contact with a recuperator heat exchanger of said catalytic reactor sub-system.

18. The carbon dioxide generating system of claim 16, further comprising a fuel air mixer in flow communication with said air supply sub-system and designed to mix a supply of air from said air supply sub-system with said desulfurized flow.

19. The carbon dioxide generating system of claim 15, further comprising a fuel heater operationally connected to said evaporator.

* * * * *

UNITED STATES PATENT AND TRADEMARK OFFICE
CERTIFICATE OF CORRECTION

PATENT NO. : 7,628,965 B2  Page 1 of 1
APPLICATION NO. : 11/556410
DATED : December 8, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 512 days.

Signed and Sealed this

Second Day of November, 2010

David J. Kappos
*Director of the United States Patent and Trademark Office*